United States Patent [19]

Hudson

[11] Patent Number: 5,215,406
[45] Date of Patent: Jun. 1, 1993

[54] ARTIFICIAL OCEAN REEF MODULE AND METHOD OF MODULE CONSTRUCTION

[76] Inventor: J. Harold Hudson, 8325 S.W. 68th St., Miami, Fla. 33143

[21] Appl. No.: 872,355

[22] Filed: Apr. 23, 1992

[51] Int. Cl.⁵ .................. E02B 3/00; A01K 61/00
[52] U.S. Cl. .......................................... 405/25; 52/315; 119/2; 405/21; 405/30
[58] Field of Search .............. 405/21, 30, 31, 26; 52/315; 119/2–4

[56] References Cited

U.S. PATENT DOCUMENTS

| | | | |
|---|---|---|---|
| 1,169,985 | 2/1916 | Mickelson | 52/315 X |
| 1,507,085 | 9/1924 | Newman | 52/315 X |
| 1,916,308 | 7/1933 | Grieco | 52/315 |
| 2,069,715 | 2/1937 | Avpin | 405/25 |
| 2,151,420 | 3/1939 | Carvel | 52/315 X |
| 3,704,687 | 12/1972 | Nohmura | 119/3 |
| 3,824,956 | 7/1974 | Presley | 119/3 |
| 4,468,885 | 9/1984 | Mandish | 119/3 X |
| 4,997,311 | 3/1991 | Van Doren | 405/30 |

Primary Examiner—Dennis L. Taylor
Attorney, Agent, or Firm—Robert J. Van Der Wall

[57] ABSTRACT

An artificial ocean reef module includes a dome having a hollow interior region, an apex and a lower edge, a ventilation port in the apex leading to the hollow interior region, covered by a hollow guide member having two opposing openings to create a venturi effect to enhance circulation through the dome, and an access port adjacent to the lower edge, leading to the hollow interior region. A base member is preferably secured to the lower edge of the dome. A method of constructing the module, using a hemispherical form having an apex, includes the steps of spreading cement on the outer surface of the form, and creating an opening in the cement at the apex to serve as a module ventilation port. A second embodiment includes a module body formed of concrete and stones and having an outer surface, and a passageway through the module body, the passageway having interior walls, wherein some of the stones protrude from the interior walls for increasing the wall surface area and the module complexity and for limiting predator access to passageway inhabitants. A method of constructing the second embodiment includes the steps of pouring sand into a first form, pressing stones into the sand so that a portion of the stones protrudes above the sand, pouring cement into the first form, permitting the cement to solidify into concrete, removing the form from the concrete, and dislodging the sand from the stones, so that the stones protrude and produce an irregular surface to enhance module complexity.

19 Claims, 5 Drawing Sheets

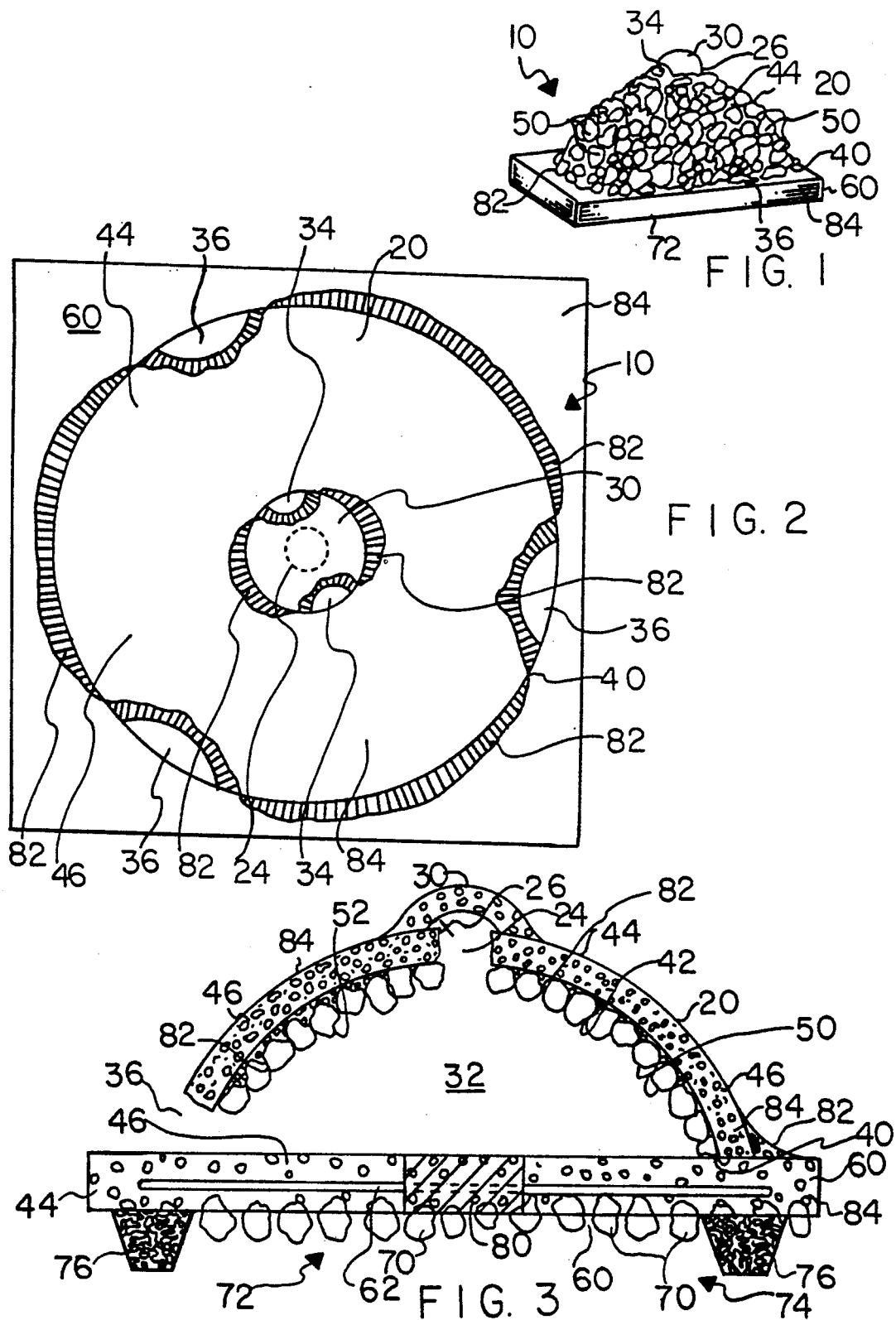

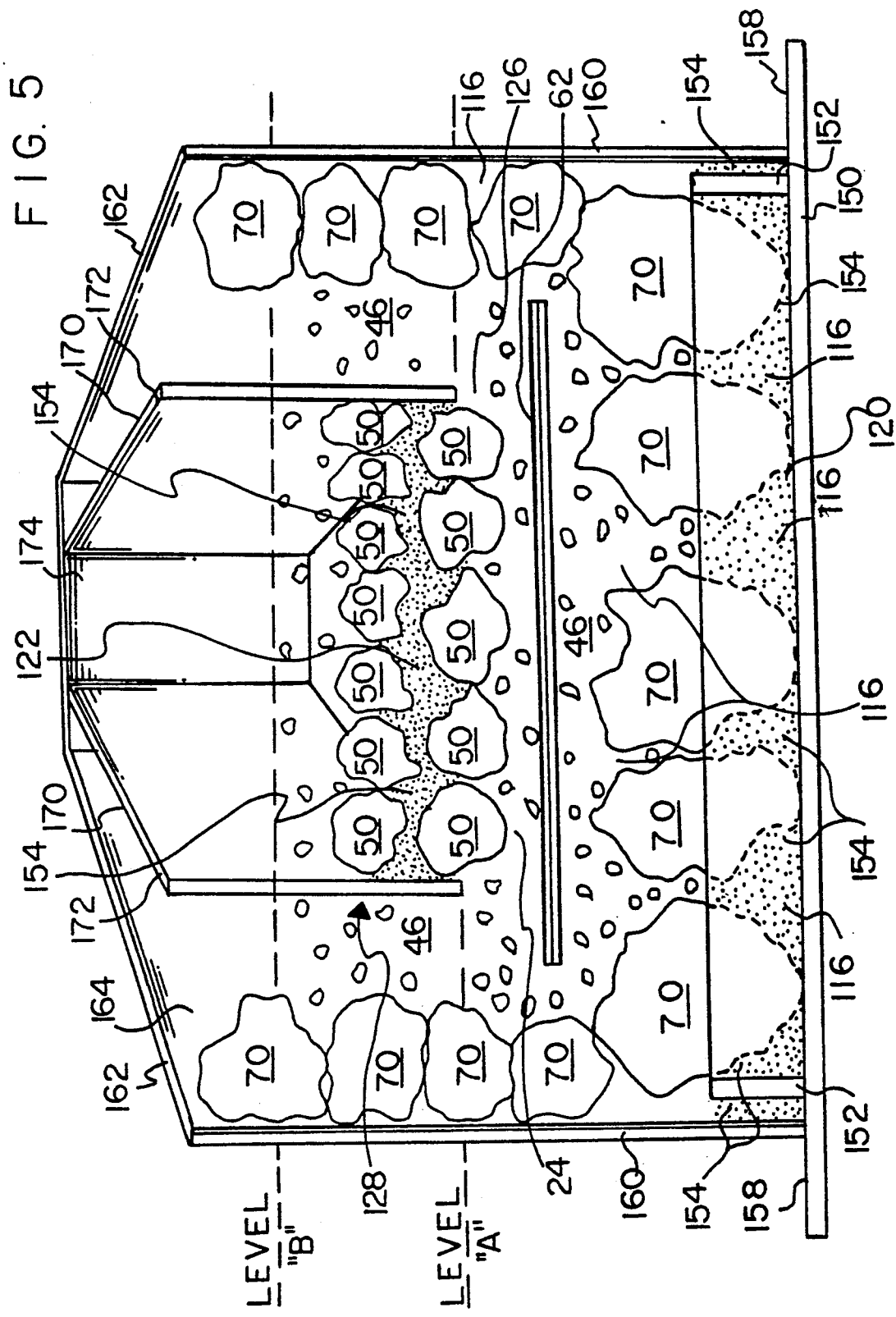

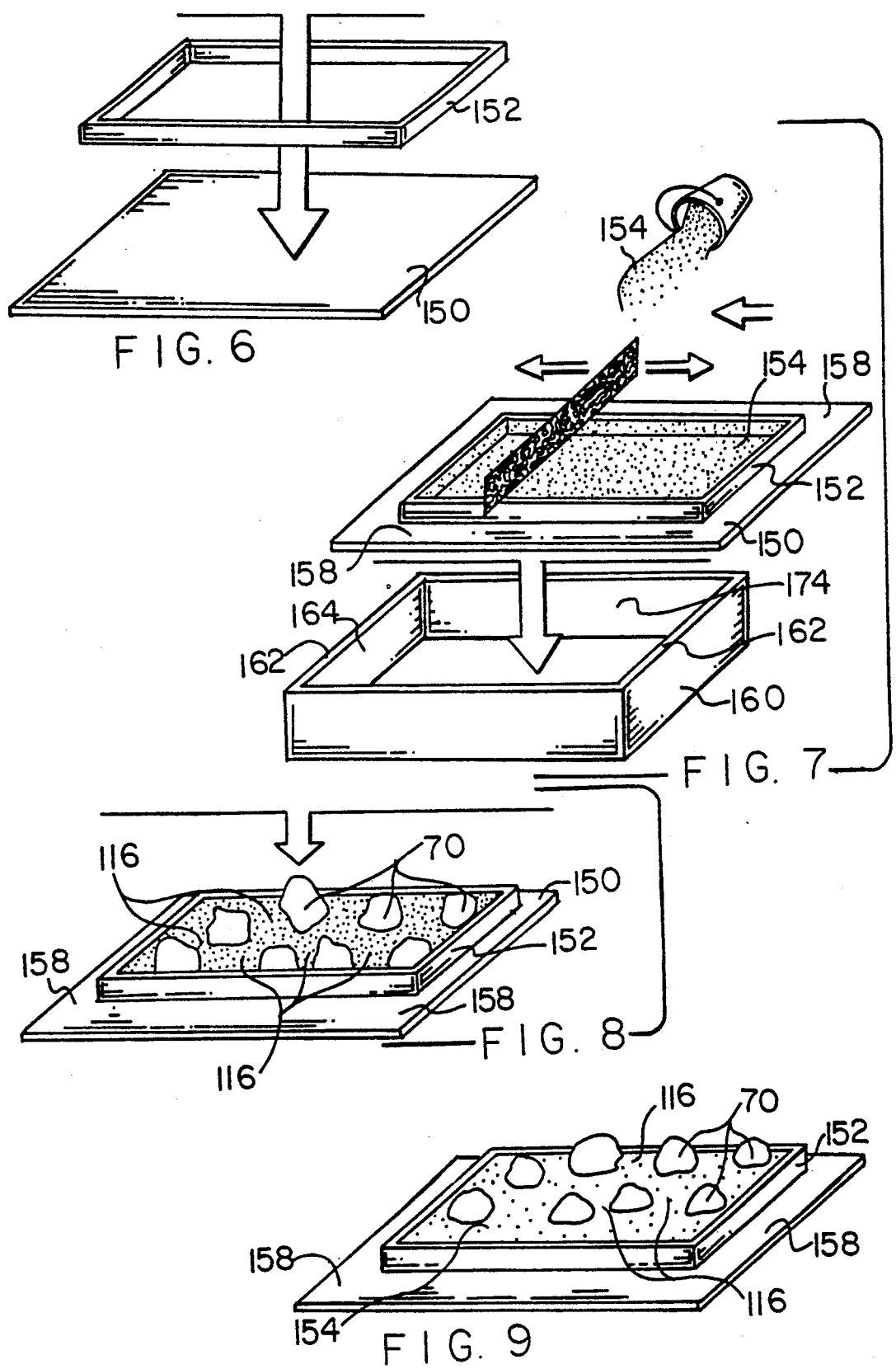

ARTIFICIAL OCEAN REEF MODULE AND METHOD OF MODULE CONSTRUCTION

BACKGROUND OF THE INVENTION

1. Field of the Invention

The present invention relates generally to the field of artificial ocean reefs, and more specifically to a modular reef structure formed of boulders and concrete, providing protective crawl spaces, ledges and overhangs which approximate naturally occurring outcrops of coral and form complex habitats for various aquatic organisms, and providing irregular surfaces suitable for attachment and growth of aquatic plant life and natural coral formations, and to a method of manufacturing the same, these structures taking the form of hollow domes having venturi assisted ventilation ports and hidden entrances to protect the inhabiting organisms from divers and natural predators, and elongate cubes having restricted passageways, selected and sized to suit a particular ocean environment, for promoting the formation of new and complete ecosystems.

2. Description of the Prior Art

The earth is covered with a vast community of life, all in continuous flux and sustained by the energy of the sun. This community is joined together by complex and varied life cycle which cross the boundary between land and sea. Man has come to recognize his place in global community and the importance of maintaining its many facets. One such facet which has received increasing attention is the ocean reef and its unique chain of life. This awareness has accelerated quickly in recent decades with the rapid advances in scientific knowledge and diving equipment, but began much earlier.

Since prehistory man has attempted to explore the sea. His initial curiosity led to ocean travel for conquest and trade, and to fishing and clam diving. Homer compared the fall of Hector's charioteer in the Iliad with the descending movement of an oyster diver. Attempts at ocean exploration for its own sake have paralleled utilitarian incursions. In ancient Assyria men tried to submerge themselves by sinking on goatskin bellows. Alexander the Great is said to have observed sea creatures from within a glass barrel, more than two thousand years ago. Leonardo da Vinci sketched primitive diving lungs. By the nineteenth century the development of the force pump for providing an air supply and the steel diving helmet permitted extended submersion and exploration. During World War II, the ingenuity of Jacques-Yves Cousteau, a French naval officer, led to the perfection of the self-contained underwater breathing apparatus, or scuba.

The increased access to ocean depths has revealed to man a rich pageantry of life never before imagined. The ocean reef, which was once merely considered a hazard for sea-going vessels, was transformed into a source of fascination and study. In recent years man has begun to recognize his own destruction of these unique aquatic communities and attempted to preserve and restore their original beauty and variety.

A number of inventions intended to achieve this goal have been developed and patented over the years. One is that of Van Doren, U.S. Pat. No. 4,997,311, issued on Mar. 5, 1991. Van Doren teaches an artificial reef including a thin-walled, plastic hemispherical dome, perforated by several access ports. The circular edge of the dome is turned diametrically outward and back to form a circumferential trough. The domes are transported by ship to the site of deployment and the trough is fitted with engaging hooks and filled with cement. After the cement cures, the hooks are tied to a hoist and the dome is lifted, swung out over the water and dropped. The concrete in the trough pulls the circular edge downward, while the access ports permit water to flow through the dome with some drag. In this way Van Doren parachutes down to the bottom in an upright position. A problem with Van Doren is that the plastic structure does not provide a naturally textured surface to encourage attachment of ocean plant life and coral-forming polyps. The smooth surface also fails to provide a complex habitat for smaller organisms. Still another problem is that the plastic degrades in an ocean environment.

Lenson, U.S. Pat. No. 4,978,247, issued on Dec. 18, 1990, discloses a concrete breakwater structure for placing on beaches to prevent erosion. Two essentially triangular end panels are joined by broad, inclined front and rear panels, each having several holes for receiving some of the wave and dissipating the impact. A projecting top panel is also provided for structural integrity and to further dissipate wave action. Lenson may be elevated on leg extensions. A problem with Lenson is that it is not designed to function as an artificial reef. Were the structure placed on an ocean floor, the directly aligned multiple holes would permit rapid currents to flow through and prevent habitation by certain organisms. The interior of the structure would also be accessible to divers and other predators. Finally, all surfaces are smooth, limiting habitat complexity.

Jones, U.S. Pat. No. 4,913,094, issued on Apr. 3, 1990 reveals an artificial reef in the form of corrugated sheets of polyvinyl chloride plastic (PVC). These sheets are joined together face to face so that the corrugations extend transverse to each other and form enclosed spaces for receiving fish and shell fish. A concrete base acts as an anchor to guide the reef to the ocean floor and to maintain its upright orientation. A problem with Jones is that, whether made of PVC or steel, the sheets are not durable in comparison with concrete structures. This means limited reef life and vulnerability to intruding divers in search of inhabiting fish. Another problem is that the sheets do not provide a natural material and a truly irregular surface conducive to attachment of epifauna and coral-forming polyps.

Suzuki, U.S. Pat. No. 4,508,057, issued on Apr. 2, 1985, discloses an algal culturing reef unit. The unit includes concrete blocks having a porous layer of iron sulfate penetrating inside the concrete. This layer is intended to create acid to neutralize the strong alkali of concrete. Crystal pellets of iron sulfate are pressed into the wet cement during manufacture and dissolve while the blocks cure. A reef design is also provided having a series of parallel planar concrete slabs joined together in a spaced apart relationship. A problem with Suzuki is that aquatic organisms are left unprotected from natural predators and divers. Another problem is that Suzuki does not present the appearance of a natural reef nor offer the deep irregularities which are attractive to various fish. As to the iron sulfate feature for neutralizing the alkali content of the concrete, the resulting formation of large quantities of algae may displace and discourage habitation by many desired species.

Schaaf, U.S. Pat. No. 4,367,978, issued on Jan. 11, 1983, teaches a concrete structure for preventing beach erosion. The structure is a prism-shaped module containing at least one converging passageway, for receiving and breaking up waves, and slowing the flow rate of the water. It also has oppositely inclined front and rear walls to break waves and serve as an off-shore, reef-like barrier. A problem with Schaaf, if used as an artificial reef, is that the passageways are open and easily accessible, so that inhabiting organisms have no protection from predation. Another problem is that currents can readily flow through the passageways at a rapid rate, preventing the anchoring of epifauna and the formation of a suitable habitat. Still another problem is that all surfaces are relatively smooth, and thus dissimilar to those of natural reefs.

O'Neil, U.S. Pat. No. 4,269,537, issued on May 26, 1981, teaches another concrete structure designed to function as a wave-absorbing barrier. O'Neil includes an essentially flat, rectangular base having a trapezoidal cross-section and four leg members. A plurality of these structures are placed along a shoreline in staggered fashion to break the impact of waves. O'Neil shares the problems identified above for Schaaf.

Pranis, U.S. Pat. No. 3,898,958, issued on Aug. 12, 1975, discloses a fish farming apparatus in the form of a framework of elongate members intended to function as an artificial reef. The members are joined by connector means to form basic units of a matrix, defining a series of open-sided cubes. The members may have a variety of different cross-sectional shapes, and surfaces roughened by sandblasting. Pranis is intended to provide stationary surfaces on which microorganisms can attach themselves and within which large and small fish may live. A problem with Pranis is that it does not resemble a natural reef and does not provide the large surface irregularities which may attract various aquatic organisms. Another problem is that the framework is open so that inhabitants are not protected from natural predators and divers. Still another problem is that the elongate members, whether formed of metal or plastic, are likely to deteriorate in an ocean environment.

Structures similar to Pranis and presenting the same general problems are disclosed in Japanese Patent Number 63-59826 and Japanese Patent Number 2-69124. Other foreign patents teaching various artificial reef and breakwater structures are: Japanese Patent Number 62-220130, Japanese Patent Number 61-96930, and Maheo, French Patent Number 1,174,670, Devin, French Patent Number 79 24207, and Carlet de la Roziere, French Patent Number 698,218, all apparently presenting problems similar to those identified above.

It is thus an object of the present invention to provide an artificial reef structure which resembles in overall shape, and provides irregularities similar to, those of naturally occurring reefs.

It is another object of the present invention to provide such a structure which offers shelter to various aquatic organisms through which water is circulated and which is capable of protecting them from natural predators and divers.

It is still another object of the present invention to provide such a structure which includes cavities to create habitats through which a slight circulating current is developed.

It is finally an object of the present invention to provide such a structure which is simple and relatively inexpensive to build and durable enough to last for many decades.

SUMMARY OF THE INVENTION

The present invention accomplishes the above-stated objectives, as well as others, as may be determined by a fair reading and interpretation of the entire specification.

An artificial ocean reef module is provided which includes a dome having a hollow interior region defined by an inner surface, an apex and a lower edge, stones protruding from the inner surface for increasing the inner surface area and module complexity, a ventilation port in the apex, leading to the hollow interior region, and an access port adjacent to the lower edge, leading to the hollow interior region. A hollow guide member is preferably provided, having two opposing openings and secured over the ventilation port to create a venturi effect and draw water out of the ventilation port, thereby circulating water through the hollow interior region. A planar base member is preferably secured to the lower edge of the dome. The planar base member has a bottom surface, and the module may additionally include protrusions on the bottom surface of the planar base member for elevating the planar base member and providing a crawl space for aquatic organisms. An access port is optionally provided, extending through the planar base member. The dome and planar base member are preferably formed of concrete. The protrusions are preferably stones protruding out of the planar base member.

A method of constructing an artificial ocean reef module is also provided, using a hemispherical form having an apex, which includes the steps of spreading cement on the outer surface of the form, and creating an opening in the cement at the apex to serve as a module ventilation port.

A second embodiment of the artificial ocean reef module is also provided which includes a module body formed of concrete and stones and having an outer surface, and a passageway through the module body, the passageway having interior walls, wherein some of the stones protrude from the interior walls for increasing the wall surface area and the module complexity and for limiting predator access to passageway inhabitants. Some of the stones preferably protrude from the outer surface of the module body for increasing module surface area and complexity. The module body is preferably shaped as an elongate cube.

A method of constructing an artificial ocean reef module is also provided, and includes the steps of pouring sand into a first form, pressing stones into the sand so that a portion of the stones protrudes above the sand, pouring cement into the first form, permitting the cement to solidify into concrete, removing the form from the concrete, and dislodging the sand from the stones, so that the stones protrude and produce an irregular surface to enhance module complexity. This method may additionally include the steps of first placing the sand and stones into a second form, which is shallower than the first form, and placing the first form over and around the second form. The sand is preferably dislodged with a pressurized stream of water. Further additional steps include discontinuing the pouring of the cement into the first form when the first form is only partly full, thereby creating a first pour cement surface, placing a bottomless third form, narrower than the first form, inside the first form and extending between two first form walls, then covering the portion of the first pour cement surface within the third form with a first layer of stones, pressing the first layer of stones partly into the first pour cement surface, covering the first layer of stones with additional sand, covering the additional sand with a second layer of stones, pouring a second pour of cement over the second layer of stones, after the first and second pours of cement solidify into concrete, and dislodging the additional sand from the stones. The additional sand is once again preferably dislodged with a pressurized stream of water. An optional additional step, wherein the second pour of cement produces an upper surface, is that of pressing stones partly into the upper surface to increase module complexity prior to solidification of the second pour.

A quick-setting cement mixture for attaching an artificial ocean reef module to a seabed is also provided, and includes eight parts portland type II cement, and two parts molding plaster.

BRIEF DESCRIPTION OF THE DRAWINGS

Various other objects, advantages, and features of the invention will become apparent to those skilled in the art from the following discussion taken in conjunction with the following drawings, in which:

FIG. 1 is a perspective view of the completed module of the first preferred embodiment of the artificial reef.

FIG. 2 is a top view of the module of the first preferred embodiment, showing the vent shield and three access ports.

FIG. 3 is a cross-sectional side view of the module of the first preferred embodiment, showing the dome, slab, rock substrate inside the dome, vent shield, legs and optional hidden access port.

FIG. 5 is a cross-sectional perspective view of an end of the three forms used to mold the second preferred embodiment, containing boulders, smaller rocks, concrete, sand and steel reinforcing members, and showing the location of pour levels A and B.

FIG. 6 is a perspective view of the low profile form being lowered onto the plywood base.

FIG. 7 is a perspective view of the low profile form resting on the plywood base, filled with sand, and the sand being leveled.

FIG. 8 is a perspective view of the low profile form, plywood base, sand, and boulders pressed into the sand.

FIG. 9 is a perspective view of the high profile form being lowered over and around the low profile form.

DETAILED DESCRIPTION OF THE PREFERRED EMBODIMENTS

Figure 4:
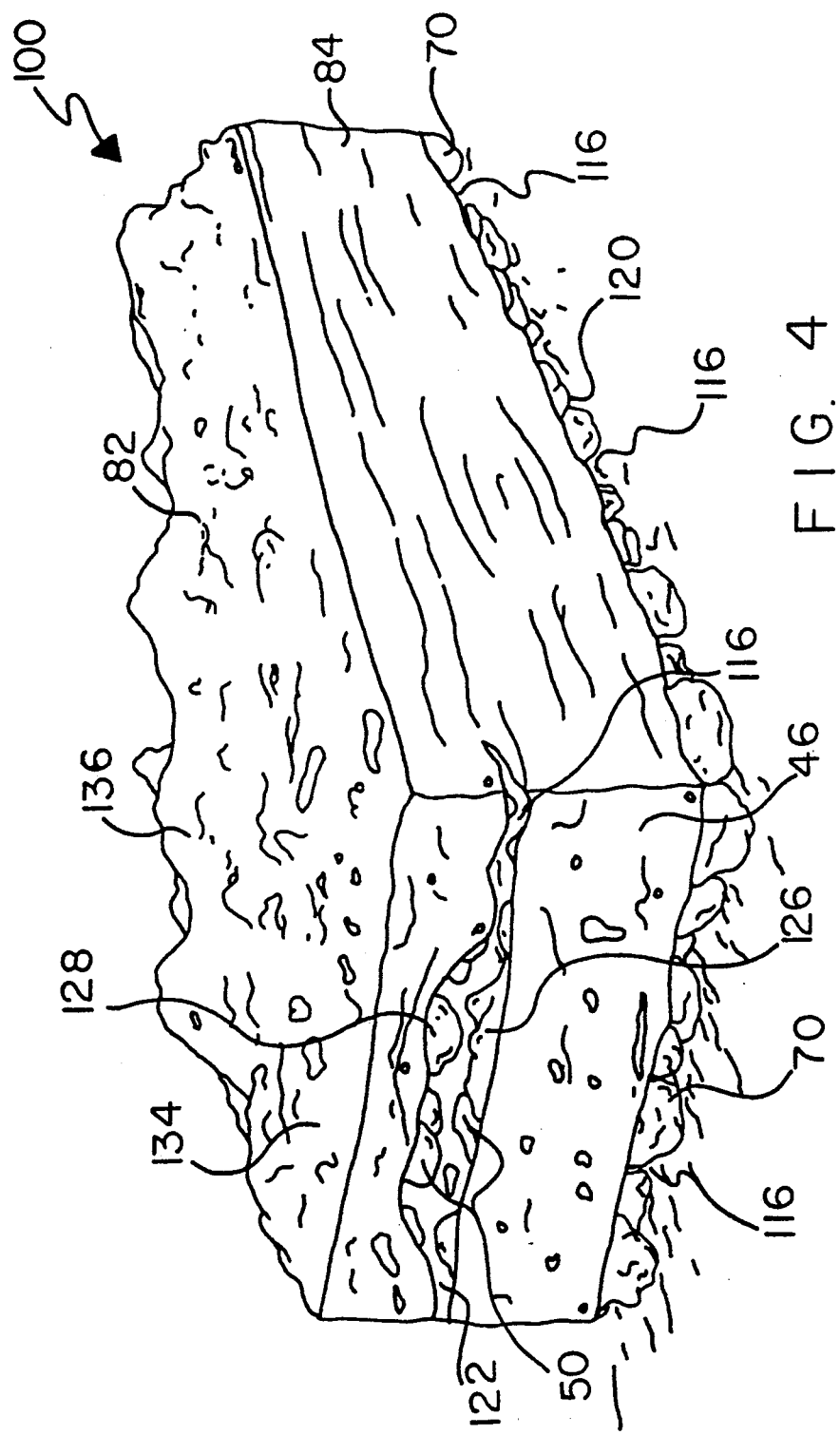
FIG. 4 is a perspective view of the second preferred embodiment of the inventive artificial reef structure, showing the crawl space and cavity.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention is virtually any appropriately detailed structure.

Reference is now made to the drawings, wherein like characteristics and features of the present invention shown in the various FIGURES are designated by the same reference numerals.

Preferred Embodiments

A modular ocean reef structure is provided, formed of boulders and concrete, having irregular surfaces, ledges and overhangs to provide complex habitats and protective shelter for various aquatic organisms and to provide surfaces suitable for the attachment and growth of aquatic plant life and coral forming polyps.

First Preferred Embodiment

Referring to FIG. 1, a hemispherical modular artificial ocean reef structure 10 is disclosed. Structure 10 includes a concrete dome 20 having a hollow interior space 32 for sheltering and protecting aquatic organisms. A ventilation port 24 is provided at the apex 26 of dome 20, and is covered by a guide member 30 for guiding the flow of water over ventilation port 24. This flow of water over port 24 creates a venturi effect and draws water out of port 24, thereby inducing circulation through interior space 32. Guide member 30 has an essentially channel-shaped body with opposing openings 34 to create a direct path for water flow. Three arched doorways or access ports 36 are preferably provided around the lower, circular edge 40 of dome 20, for organisms to enter and exit. See FIG. 2. The shape of dome 20 is intended to mimic naturally occurring coral colonies which assume hemispherical configurations.

Dome 20 is formed of cement and aggregate 46 which is composed of portland type II cement mixed with a calcium carbonate stone aggregate. Prototype testing has shown that a one meter diameter dome 20 is suitable, but many other dome 20 sizes are contemplated. Ventilation port 24 is preferably three inches to one foot in diameter. Guide member 30 may be an inverted channel segment or a miniature dome. Guide member 30 also prevents divers and large natural predators from gaining access to dome 20 inhabitants. Dome 20 has a concave inner surface 42 and a convex outer surface 44, both of which are preferably covered with carbonate rocks 50 or living coral species to create a substrate 52 and add complexity to outer surface 44. See FIGURE 3.

Structure 10 optionally includes a concrete deployment slab 60 upon which dome 20 rests. Slab 60 is preferably square and formed of concrete 84, containing steel reinforcing members 62. Members 62 preferably have a protective coating of epoxy or other suitable material. Prototype testing has shown that a convenient size for slab 60 is four feet to a side, but this is not to be construed as limiting and many other slab 60 dimensions are contemplated. Slab 60 may have boulders 70 protruding from its bottom surface 72 to provide a crawl space 74 for various organisms, as recited below for the second embodiment. Concrete support legs 76 are also optionally provided at each of the four corners of slab 60. Also optionally provided is an access port 80 in the center of slab 60, which becomes hidden when dome 20 is placed on slab 60.

For deep water deployment, dome 20 may be secured to the top of slab 60 with a fillet of grout 82 around dome 20 lower edge 40. Then the unified dome 20 and slab 60 structure 10 is simply placed on the ocean floor. Dome 20 is alternatively attached directly to a seabed with a special quick-setting lime cement, which is a mixture of eight parts portland type II cement and two parts molding plaster. Prototype testing has shown that this mixture hardens in six to ten minutes underwater. Alternatively, dome 20 may be attached to the upper surface of the structure set forth below as the second embodiment, in the event a combination of the two is desired.

Method of Constructing the First Embodiment

Figure 10:
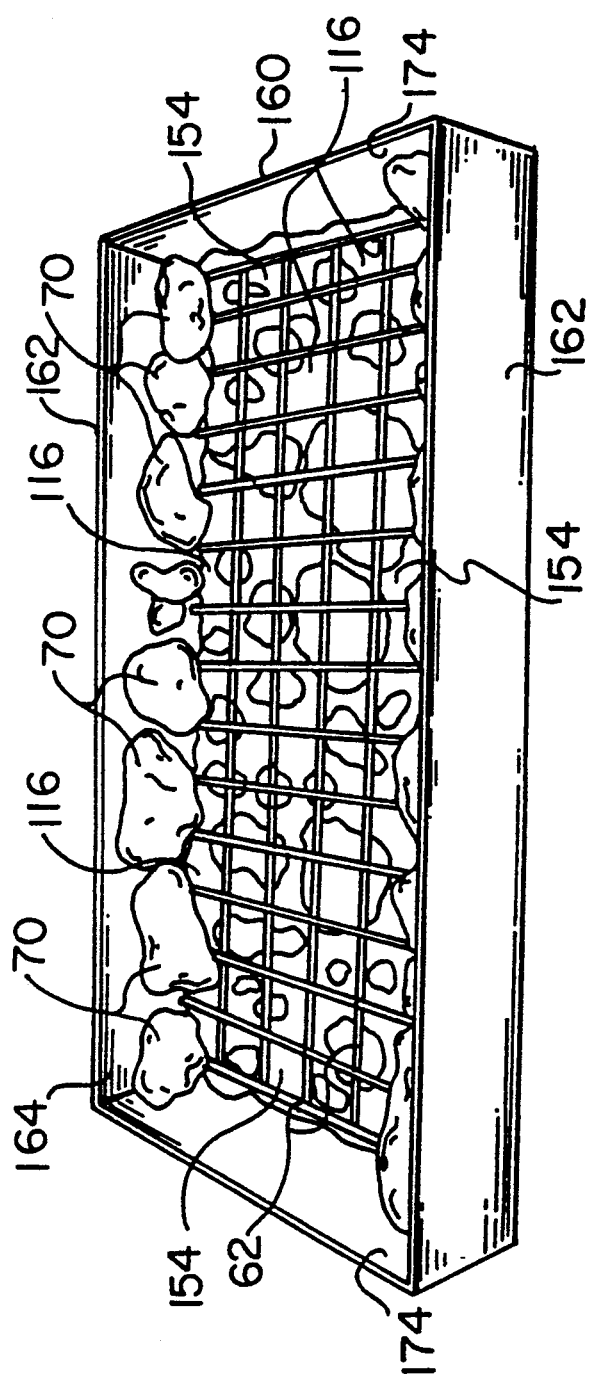
FIG. 10 is a perspective view of the high profile form in place around the low profile form, containing a bottom layer of boulders, steel reinforcing members, and additional boulders stacked along the sides of the high profile form on top of the steel reinforcing members.

In practicing the invention, the following method may be used. To manufacture the first preferred embodiment, a hemispherical interior mold is prepared to form dome 20. The interior mold is preferably constructed of a wood frame, with fiberglass laid over the frame. A plastic film is placed over the interior mold to prevent adhesion of concrete 84. Type II cement with an aggregate of silica sand and chattahoochee gravel 86 is spread over the exterior of the interior mold, preferably to a thickness of about three inches. Spaced apart gaps in cement and aggregate 46 are created adjacent to lower edge 40 of dome 20 to serve as access ports 36 for reef biota. A four inch diameter PVC pipe is inserted through cement and aggregate 46 at the apex 26 of dome 20 to create ventilation port 24. Any cement and aggregate 46 inside the PVC pipe is removed. Guide member 30 is molded separately and can be attached over ventilation port 24 with grout 82 after dome cement and aggregate 46 hardens. Cement and aggregate 46 is permitted to cure for three days prior to removal of the interior mold. Cement grout 82 is optionally spread over inner surface 42 of dome 20 and pieces of carbonate rock 50 are inserted into grout 82, to form substrate 52. See FIG. 10.

Slab 60 is formed according to conventional methods. Steel reinforcing members 62 are placed in a square form and cement and aggregate 46 is poured into the square form. If the optional hidden access port 80 feature is desired, a smaller circular form having the required hidden access port 80 dimensions is fitted into the middle area of square form. Then boulders 70 are optionally pressed half way into the wet cement and aggregate 46 to create crawl space 74 underneath slab 60. Pre-formed concrete legs 76 have protruding reinforcing members 62 which can be inserted into the square form corners at this stage. Then slab 60 is permitted to cure for three days before removal from the square form.

Second Preferred Embodiment

A second preferred embodiment of the modular reef structure 100 is disclosed which includes an elongate cube formed of an array of boulders 70 joined together by concrete 84 filling the intersticial spaces 116 between boulders 70. See FIG. 4. By controlling the sizes and quantities of boulders 70 and the spacing between them, structures 100 of various dimensions may be formed. In this way each structure 100 can be designed for a particular size category of organisms.

Irregular passageways and continuous voids are provided beneath and through structure 100, each in the form of an interconnecting, continuous series of interstitial spaces 116 from one end of structure 100 to another end. One such continuous series of spaces 116 is provided around the lower halves of boulders 70 at the bottom of structure 100, which forms a crawl space 120 underneath structure 100. See FIG. 5. Crawl space 120 provides shelter for various shell fish and other larger reef inhabitants. A smaller series of spaces 116 extends through the body of structure 100, to form a cavity 122 for sheltering smaller organisms Cavity 122 is formed of the interstitial spaces 116 between the top halves of a first layer 126 of small rocks 50 and spaces 116 between the bottom halves of an adjacent upper layer 128 of small rocks 50. Ocean currents create slow circulation through crawl space 120 and cavity 122.

Boulders 70 are naturally formed accumulations of calcium carbonate, and their exposed surfaces permit maximum biotic interaction, such as boring by clams and sponges to create micro-relief and specialized habitats. Concrete 84 is Portland Type II cement mixed with a calcium carbonate aggregate 46. Steel reinforcing members 62, protectively coated such as with epoxy, are sparingly provided within structure 100 as needed. The size of a particular structure 100 determines the length and number of steel reinforcing members 62 to be included, if any.

The outer surface 134 of structure 100 is preferably covered with surfacing material 136 such as small rocks 50 attached with grout 82 to create irregularities and recesses. See FIG. 4. Material 136 increases the complexity and overall surface area of structure 100. The most convenient surfacing material 136 is usually fragments of boulder 70 material, although living coral colonies may also be attached.

Structure 100 may simply rest on the ocean floor or be joined to existing formations. The preferred means of attachment is directly to a rocky sea bed with a special quick-setting lime cement of portland type II. As described for the first embodiment, this special cement is a mixture of eight parts portland type II cement and two parts molding plaster, which cures in six to ten minutes underwater.

Method of Constructing the Second Embodiment

In practicing the invention, the following method may be used. To construct structure 100, a rectangular plywood base 150 is laid down and a low-profile rectangular form 152 is placed on top of base 150. See FIG. 6. The depth of form 152 is approximately half the diameter of an average boulder 70. Base 150 has a greater length and width than form 152, so that base 150 protrudes and creates a perimetrial ledge 158 surrounding form 152. Form 152 is filled with sand 154 and leveled with a screed sand level 156. See FIG. 7. Boulders 70 are pressed into sand 154 until they touch base 150. See FIG. 8. Then a high profile form 160 is placed around form 152 on ledge 158, form 160 being sized to create about a one inch clearance between forms 152 and 160. See FIG. 9. Additional sand 154 is poured to fill this one inch clearance area. Steel reinforcing members 62 are placed on top of boulders 70 as needed. Additional boulders 70 are stacked against the inner surfaces 164 of walls 162 of form 160, and cement and aggregate 46 are poured to about half fill form 160. See FIG. 10. This level is marked as level A in FIG. 5.

Then a smaller, bottomless form 170 for creating cavity 122 is inserted into form 160. Form 170 includes two parallel panels 172 which fit flush between two opposing walls 174 of form 160 and are spaced apart from each other and from the remaining two form 160 walls 162. See FIG. 5. Form 170 extends from the top of the first solidified pour, marked as level A, to the top of form 160. Smaller rocks 50 are pressed into cement and aggregate 46 within form 170 at level A to cover the entire bottom area of form 170 and create a first layer 126. Then sand 154 is spread on top of layer 126 to a depth of several inches, and another layer 128 of rocks 50 is pressed half way into sand 154. Then cement and aggregate 46 is poured a second time to fill forms 160 and 170 to level B, so that form 170 is about three quarters full. Once this second pour has partially solidified, form 170 is removed. Then boulders 70 are pressed half way into cement and aggregate 46 and a third pour is made to completely fill form 160.

Additional levels and cavities 122 can optionally be added on top of this structure so that second, third, fourth or even fifth tiers are provided. Then cement and aggregate 46 is permitted to cure for three days. When hardening is complete, forms 152 and 160 are pried apart and removed, to reveal a new structure 100. Sand 154 is removed from structure 100 with a high-pressure water hose, and saved for reuse. The interstitial spaces 116 occupied by sand 154 become crawl space 120 and cavity 122. The outer surface 134 of structure 100 is optionally covered with grout 82 and small rocks 50 or coral colonies, in stucco fashion.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. An artificial ocean reef module comprising:
   a dome having a hollow interior region defined by an inner surface, an apex and a lower edge,
   stones protruding from said inner surface to an extent causing said inner surface to be substantially cragged, for increasing the inner surface area and module complexity,
   a ventilation port in said apex, leading to said hollow interior region,
   an access port adjacent to said lower edge, leading to said hollow interior region.

2. An artificial ocean reef module according to claim 1, additionally comprising:
   a hollow guide member having two opposing openings and secured over said ventilation port to create a venturi effect and draw water out of said ventilation port, thereby circulating water through said hollow interior region.

3. An artificial ocean reef module according to claim 1, additionally comprising:
   a planar base member secured to said lower edge of said dome.

4. An artificial ocean reef module according to claim 3, wherein said planar base member has a bottom surface, additionally comprising:
   protrusions on said bottom surface of said planar base member for elevating said planar base member and providing a crawl space for aquatic organisms.

5. An artificial ocean reef module according to claim 3, additionally comprising:
   an access port extending through said planar base member.

6. An artificial ocean reef module according to claim 1, wherein said dome is formed of concrete.

7. An artificial ocean reef module according to claim 3, wherein said planar base member is a concrete slab.

8. An artificial ocean reef module according to claim 4, wherein said protrusions are stones protruding out of said planar base member.

9. An artificial ocean reef module comprising:
   a dome having a hollow interior region and a lower edge,
   a ventilation port leading to said hollow interior region,
   a hollow guide member having two opposing openings and secured over said ventilation port to create a venturi effect and draw water out of said ventilation port, thereby circulating water through said hollow interior region,
   an access port adjacent to said lower edge, leading to said hollow interior region.

10. An artificial ocean reef module comprising:
    a module body formed of concrete and stones and having an outer surface,
    a passageway through said module body, said passageway having interior walls, wherein some of said stones protrude from said interior walls to an extent causing said interior walls to be substantially cragged, for increasing the interior wall surface area and module complexity and for limiting predator access to passageway inhabitants.

11. An artificial ocean reef module according to claim 10, wherein some of said stones protrude from said outer surface for increasing module surface area and complexity.

12. An artificial ocean reef module according to claim 10, wherein said module body is shaped as an elongate cube.

13. An artificial ocean reef module comprising:
    a dome having a hollow interior region defined by an inner surface, an apex and a lower edge,
    a ventilation port in said apex, leading to said hollow interior region,
    an access port adjacent to said lower edge, leading to said hollow interior region,
    a hollow guide member having two opposing openings and secured over said ventilation port to create a venturi effect and draw water out of said ventilation port, thereby circulating water through said hollow interior region.

14. An artificial ocean reef module comprising:
    a dome having a hollow interior region defined by an inner surface, an apex and a lower edge,
    a ventilation port in said apex, leading to said hollow interior region,
    an access port adjacent to said lower edge, leading to said hollow interior region,
    a planar base member secured to said lower edge of said dome,
    an access port extending through said planar base member.

15. A method of constructing an artificial ocean reef module, comprising the steps of:
    pouring sand into a first form,
    pressing stones into said sand so that a portion of said stones protrudes above said sand,
    pouring cement into said first form,
    discontinuing the pouring of said cement into said first form when said first form is only partly full, creating a first pour cement surface,
    dislodging said sand from said stones, so that said stones protrude and produce an irregular surface to enhance module complexity, placing a bottomless third form, narrower than said first form, inside said first form extending between two first form walls, covering the portion of said first pour cement surface within said third form with a first layer of stones, pressing said first layer of stones partly into said first pour cement surface, covering said first layer of stones with additional sand, covering said additional sand with a second layer of stones, pouring a second pour of cement over said second layer of stones, after said first and second pours of cement solidify into concrete, dislodging said additional sand from said stones.

16. A method according to claim 15, wherein said second pour of cement produces an upper surface, additionally comprising the step of:

pressing stones partly into said upper surface to increase module complexity prior to solidification of said second pour.

17. A method according to claim 15, wherein said additional sand is dislodged with a pressurized stream of water.

18. An artificial ocean reef module comprising:
a dome having a hollow interior region defined by an inner surface, an apex and a lower edge,
a layer of stones secured to said inner surface for increasing the inner surface area and module complexity,
a ventilation port in said apex, leading to said hollow interior region,
an access port adjacent to said lower edge, leading to said hollow interior region.

19. An artificial ocean reef module comprising:
a dome having a hollow interior region defined by an inner surface, an apex and a lower edge,
stones protruding from said inner surface to an extent causing said inner surface to be substantially irregular, for increasing the inner surface area and module complexity,
a ventilation port in said apex, leading to said hollow interior region,
an access port adjacent to said lower edge, leading to said hollow interior region.

* * * * *